(12) United States Patent
Mestery et al.

(10) Patent No.: US 12,432,059 B2
(45) Date of Patent: Sep. 30, 2025

(54) DECENTRALIZED INTERNET PROTOCOL SECURITY KEY NEGOTIATION

(71) Applicant: Cisco Technology, Inc., San Jose, CA (US)

(72) Inventors: Kyle Mestery, Woodbury, MN (US); Grzegorz Boguslaw Duraj, Vancouver (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 36 days.

(21) Appl. No.: 18/489,317

(22) Filed: Oct. 18, 2023

(65) Prior Publication Data
US 2025/0132910 A1  Apr. 24, 2025

Related U.S. Application Data

(60) Continuation of application No. 17/705,810, filed on Mar. 28, 2022, now Pat. No. 11,831,767, which is a
(Continued)

(51) Int. Cl.
*H04L 9/08* (2006.01)
*H04L 9/16* (2006.01)
(Continued)

(52) U.S. Cl.
CPC .......... *H04L 9/0894* (2013.01); *H04L 9/0891* (2013.01); *H04L 9/16* (2013.01);
(Continued)

(58) Field of Classification Search
None
See application file for complete search history.

(56) References Cited

U.S. PATENT DOCUMENTS

| 7,689,722 B1 | 3/2010 | Timms et al. |
| 9,063,866 B1 | 6/2015 | Tati et al. |

(Continued)

FOREIGN PATENT DOCUMENTS

| CN | 1714560 A | 12/2005 |
| CN | 103155512 A | 6/2013 |

(Continued)

OTHER PUBLICATIONS

Lang, Y., "Defect Analysis and Improvement of IKE Protocol", China Academic Journal Electronic Publishing House, http://www.cnki.net, Apr. 15, 2005, 9 pages.
(Continued)

*Primary Examiner* — Michael W Chao
(74) *Attorney, Agent, or Firm* — Edell, Shapiro & Finnan, LLC

(57) ABSTRACT

Methods are provided for decentralized key negotiation. One method includes initiating, by a first Internet Key Exchange (IKE) node from among a plurality of IKE nodes, a rekeying process for an Internet Protocol Security (IPSec) communication session established with a client device and serviced by a second IKE node from among the plurality of IKE nodes, and in which a first encryption key is used to encrypt traffic. The method further includes obtaining, by the first IKE node from a key value store, information about the IPSec communication session and performing, by the first IKE node, at least a part of the rekeying process in which the first encryption key is replaced with a second encryption key for the IPSec communication session.

20 Claims, 9 Drawing Sheets

Related U.S. Application Data division of application No. 16/569,930, filed on Sep. 13, 2019, now Pat. No. 11,368,298.

(60) Provisional application No. 62/848,692, filed on May 16, 2019.

(51) Int. Cl.
*H04L 9/40* (2022.01)
*H04L 12/46* (2006.01)
*H04L 45/24* (2022.01)
*H04L 67/01* (2022.01)

(52) U.S. Cl.
CPC ...... *H04L 12/4633* (2013.01); *H04L 12/4641* (2013.01); *H04L 45/24* (2013.01); *H04L 63/0272* (2013.01); *H04L 63/0428* (2013.01); *H04L 63/061* (2013.01); *H04L 63/164* (2013.01); *H04L 67/01* (2022.05)

(56) References Cited

U.S. PATENT DOCUMENTS

| | | | |
|---|---|---|---|
| 9,424,117 | B1 | 8/2016 | Bono et al. |
| 9,438,566 | B2 | 9/2016 | Zhang et al. |
| 9,516,065 | B2 | 12/2016 | Suram et al. |
| 9,544,282 | B2 | 1/2017 | Akhter et al. |
| 10,397,189 | B1* | 8/2019 | Hashmi ............... H04L 63/0272 |
| 10,623,372 | B2 | 4/2020 | Wang et al. |
| 11,025,483 | B1 | 6/2021 | Hashmi |
| 11,159,366 | B1 | 10/2021 | Gawade et al. |
| 11,563,601 | B1 | 1/2023 | Vishnu et al. |
| 2003/0165139 | A1 | 9/2003 | Chen et al. |
| 2004/0019645 | A1 | 1/2004 | Goodman et al. |
| 2004/0088537 | A1 | 5/2004 | Swander et al. |
| 2006/0007903 | A1 | 1/2006 | Hammell et al. |
| 2006/0010320 | A1 | 1/2006 | Chuang |
| 2006/0146991 | A1 | 7/2006 | Thompson et al. |
| 2006/0167894 | A1 | 7/2006 | Wunner |
| 2006/0248583 | A1* | 11/2006 | Inoue ................... H04L 63/164 726/14 |
| 2007/0038853 | A1 | 2/2007 | Day et al. |
| 2007/0113275 | A1* | 5/2007 | Khanna ............... H04L 67/1038 713/151 |
| 2007/0288585 | A1 | 12/2007 | Sekiguchi et al. |
| 2008/0033845 | A1 | 2/2008 | McBride et al. |
| 2008/0127337 | A1 | 5/2008 | Dawson et al. |
| 2008/0137863 | A1 | 6/2008 | Thomas |
| 2008/0162924 | A1* | 7/2008 | Chinitz ............... H04L 63/20 713/153 |
| 2009/0150668 | A1 | 6/2009 | Liu et al. |
| 2010/0057849 | A1 | 3/2010 | Ji |
| 2010/0162383 | A1* | 6/2010 | Linden ................ H04L 41/0893 726/13 |
| 2010/0223458 | A1 | 9/2010 | McGrew et al. |
| 2010/0228962 | A1 | 9/2010 | Simon et al. |
| 2010/0268935 | A1* | 10/2010 | Rodgers ................ H04L 63/164 713/153 |
| 2010/0281251 | A1 | 11/2010 | Arauz Rosado |
| 2010/0318800 | A1 | 12/2010 | Simon et al. |
| 2011/0035796 | A1 | 2/2011 | Khalid et al. |
| 2012/0023241 | A1* | 1/2012 | Goel ..................... H04W 76/19 709/228 |
| 2012/0096269 | A1* | 4/2012 | McAlister ............. H04L 63/061 713/171 |
| 2012/0143829 | A1 | 6/2012 | Fontenot et al. |
| 2012/0304276 | A1 | 11/2012 | Legacy et al. |
| 2013/0003975 | A1 | 1/2013 | Fukuda et al. |
| 2013/0125125 | A1 | 5/2013 | Karino et al. |
| 2013/0201909 | A1 | 8/2013 | Bosch et al. |
| 2013/0238794 | A1 | 9/2013 | Ng et al. |
| 2013/0263249 | A1 | 10/2013 | Song et al. |
| 2013/0311778 | A1 | 11/2013 | Cherukuri et al. |
| 2014/0108781 | A1 | 4/2014 | Zhang et al. |
| 2014/0281508 | A1 | 9/2014 | Akhter et al. |
| 2014/0365621 | A1 | 12/2014 | Vieira |
| 2014/0369204 | A1 | 12/2014 | Anand et al. |
| 2015/0101012 | A1 | 4/2015 | White et al. |
| 2015/0195265 | A1* | 7/2015 | Chen ................... H04L 63/08 726/3 |
| 2015/0215300 | A1 | 7/2015 | Buonacuore et al. |
| 2015/0288765 | A1* | 10/2015 | Skraparlis ............ H04L 69/40 709/228 |
| 2015/0304282 | A1 | 10/2015 | Xu et al. |
| 2016/0021194 | A1* | 1/2016 | Prabhakar ........... H04L 63/0272 709/204 |
| 2016/0105401 | A1 | 4/2016 | Vemulapalli et al. |
| 2016/0197831 | A1 | 7/2016 | De Foy et al. |
| 2016/0373300 | A1 | 12/2016 | Liu |
| 2017/0063808 | A1 | 3/2017 | Manapragada et al. |
| 2018/0034643 | A1* | 2/2018 | Yang ..................... H04L 63/166 |
| 2018/0092140 | A1* | 3/2018 | Dong ................... H04W 76/12 |
| 2018/0167206 | A1 | 6/2018 | Raza et al. |
| 2018/0262454 | A1 | 9/2018 | Zandi et al. |
| 2018/0262598 | A1 | 9/2018 | Zhang et al. |
| 2018/0316500 | A1 | 11/2018 | Xu et al. |
| 2018/0352036 | A1 | 12/2018 | Baid et al. |
| 2019/0190710 | A1 | 6/2019 | Chopra et al. |
| 2019/0306116 | A1 | 10/2019 | Paul et al. |
| 2019/0372936 | A1* | 12/2019 | Sullenberger ........ H04L 63/164 |
| 2019/0372948 | A1 | 12/2019 | Varghese et al. |
| 2020/0036679 | A1* | 1/2020 | Chand .................. H04L 47/28 |
| 2020/0120078 | A1 | 4/2020 | Mao et al. |
| 2020/0351254 | A1 | 11/2020 | Xiong et al. |
| 2021/0152518 | A1* | 5/2021 | Pawar ................... H04L 63/029 |
| 2021/0250193 | A1 | 8/2021 | Hojsik et al. |

FOREIGN PATENT DOCUMENTS

| | | |
|---|---|---|
| CN | 104219217 A | 12/2014 |
| CN | 104660603 A | 5/2015 |
| CN | 106533881 A | 3/2017 |
| CN | 108293058 A | 7/2018 |
| EP | 2720438 A1 | 4/2014 |
| EP | 3301852 A1 | 4/2018 |
| TW | 200637255 A | 10/2006 |

OTHER PUBLICATIONS

Notice of Intention to Grant for counterpart Chinese Application No. 202080036244.9, dated Sep. 2, 2024, 10 pages.
Shaheen, S.H., et al., "Source Specific Centralized Secure Multicast Scheme based on IPSec", 2015 Conference on Information Assurance and Cyber Security (CIACS), IEEE, Dec. 18, 2015, 6 pages.
First Examination Report for counterpart Indian Application No. 202147050033, mailed on Nov. 7, 2023, 7 pages.
Huang G., et al., "A Traffic-Based Method of Detecting Dead Internet Key Exchange (IKE) Peers," The Internet Society, Network Working Group, RFC: 3706, Category: Informational, Feb. 2004, 13 pages.
International Search Report and Written Opinion in counterpart International Application No. PCT/US2020/032002, mailed Jul. 27, 2020, 14 pages.
International Preliminary Report on Patentability for International Application No. PCT/US2020/032002, mailed Nov. 25, 2021, 9 pages.
Kaufman, C. et al., "Internet Key Exchange Protocol Version 2 (IKEv2)", Internet Engineering Task Force (IETF), RFC 5996, ISSN: 2070-1721, Sep. 2010, 138 pages.
Son, J. et al., "Protego: Cloud-Scale Multitenant IPsec Gateway", Proceedings of the 2017 USENIX Annual Technical Conference (USENIX ATC '17), Jul. 12-14, 2017, ISBN 978-1-931971-38-6, 15 pages.
Vajaranta M., et al., "IPsec and IKE as Functions in SDN Controlled Network," Springer, LNCS 10394, Network and System Security 11th International Conference, NSS Aug. 2017, 13 pages.
Xenakis C., et al., "Dynamic Network-Based Secure VPN Deployment in GPRS," https://www.researchgate.net/publication/3974770_Dynamic_network-based_secure_VPN_deployment_in_GPRS, Oct. 2002, 7 pages.

(56) References Cited

OTHER PUBLICATIONS

Zheng, Y. et al., "Network and System Security", 11th International Conference, NSS 2017 Helsinki, Finland, Aug. 21-23, 2017, Proceedings, Springer, 13 pages.
Office Action for counterpart Chinese Application No. 202080036244.9, mailed May 11, 2024, 28 pages.
Office Action for European Application No. 20729402.6, dated Mar. 4, 2025, 5 pages.

* cited by examiner

700

702 — OBTAINING, BY A KEY VALUE STORE DEVICE FROM A FIRST IKE NODE FROM AMONG A PLURALITY OF IKE NODES, A FIRST MESSAGE INDICATING THAT AN IPSEC COMMUNICATION SESSION NEEDS TO BE REKEYED, WHEREIN THE IPSEC COMMUNICATION SESSION IS ESTABLISHED WITH A CLIENT DEVICE AND IS SERVICED BY A SECOND IKE NODE

704 — PROVIDING, BY THE KEY VALUE STORE DEVICE TO THE FIRST IKE NODE, INFORMATION ABOUT THE IPSEC COMMUNICATION SESSION INCLUDING A SECURITY ASSOCIATION TO ENABLE THE FIRST IKE NODE TO LOCALLY INSTALL THE IPSEC COMMUNICATION SESSION SO AS TO INITIATE A REKEYING PROCESS AND SO AS TO REMOVE THE IPSEC COMMUNICATION SESSION FROM THE SECOND IKE NODE

FIG.7

DECENTRALIZED INTERNET PROTOCOL SECURITY KEY NEGOTIATION

CROSS-REFERENCE TO RELATED APPLICATIONS

This application is a continuation application of U.S. patent application Ser. No. 17/705,810, filed on Mar. 28, 2022, now U.S. Pat. No. 11,831,767, issued Nov. 28, 2023, which is a divisional of U.S. patent application Ser. No. 16/569,930, filed on Sep. 13, 2019, now U.S. Pat. No. 11,368,298, issued Jun. 21, 2022, which claims priority to U.S. Provisional Patent Application No. 62/848,692, filed on May 16, 2019. The above applications are hereby incorporated by reference herein in their entireties.

TECHNICAL FIELD

The present disclosure relates to Internet Protocol Security, and to Internet Protocol Security rekeying processes, in particular.

BACKGROUND

In Internet Protocol Security (IPsec) environments, key negotiation for both Internet Key Exchange (IKE) and Encapsulating Security Payload (ESP) security associations (SAs) are performed on a single host. In this manner, either a client or a server may initiate a rekey process. For security reasons, the keys negotiated for IKE and ESP security associations (SAs) are only used for a limited amount of time and/or to protect a limited amount of data. This means that each security association (SA) should expire after a specific lifetime, which may be measured in time or quantity of data. To avoid interruptions, a replacement SA may be negotiated before the expiration of the lifetime. This function is called "rekeying". The rekeying process involves an exchange of packets whereby the client and the server both negotiate a new set of keys. In the case of IKE SAs, this is performed for the IKE session itself. In the case of ESP SAs (also referred to as child SAs), an IKE exchange is used to rekey the ESP encryption used for the traffic that flows across the IPSec tunnel. These rekeying processes happen on an interval negotiated when the client and server set up the tunnel.

From the server point of view, the actual process of negotiating the keys is always performed via a single host. That is, the entire rekey protocol including negotiating the keys is performed on a single host such that once the process is kicked off, the process is handled on a single host. Such single-host processes may lead to scaling limitations.

BRIEF DESCRIPTION OF THE DRAWINGS

FIG. 7 is a flowchart illustrating a method of a decentralized IPSec key negotiation performed by a key value store device, according to an example embodiment.

DESCRIPTION OF EXAMPLE EMBODIMENTS

Overview

Figure 1:
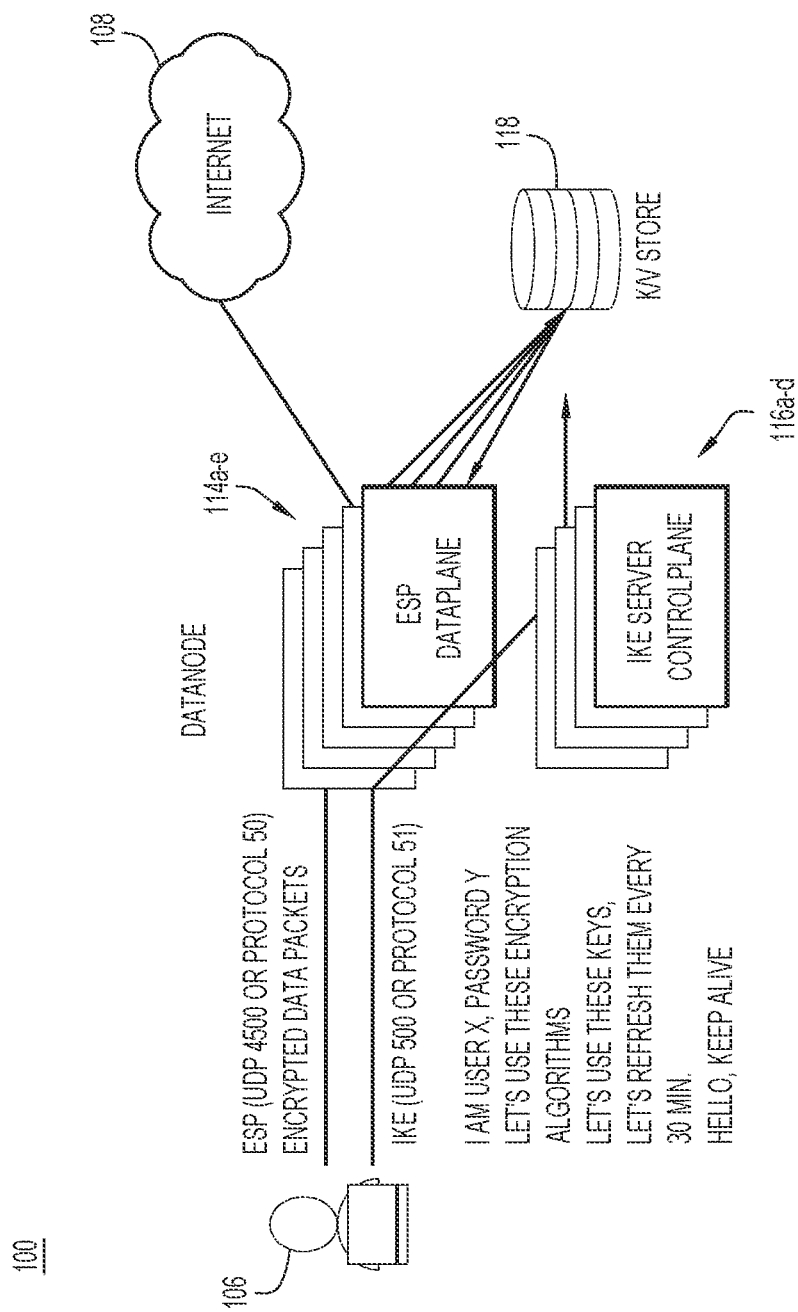
FIG. 1 is a block diagram illustrating an IPSec architecture configured to implement a key negotiation process, according to an example embodiment.

Methods, an apparatus, and computer readable media are provided which may be used to perform decentralized IPSec key negotiations.

According to one such method, a first IKE node from among a plurality of IKE nodes initiates a rekeying process for an IPSec communication session established with a client device and serviced by a second IKE node from among the plurality of IKE nodes. In the IPSec communication session a first encryption key is used to encrypt traffic. The method further includes obtaining, by the first IKE node from a key value store, information about the IPSec communication session and performing, by the first IKE node, at least a part of the rekeying process in which the first encryption key is replaced with a second encryption key for the IPSec communication session.

According to yet another method, a key value store device obtains from a first IKE node from among a plurality of IKE nodes, a first message indicating that an IPSec communication session needs to be rekeyed, the IPSec communication session is established with a client device and is serviced by a second IKE node. The method further includes providing, by the key value store device to the first IKE node, information about the IPSec communication session including a security association to enable the first IKE node to locally install the IPSec communication session so as to initiate a rekeying process and so as to remove the IPSec communication session from the second IKE node.

According to yet another method, a first IKE node from among a plurality of IKE nodes, obtains a subscription message published by a key value store. The subscription message includes information about an IPSec communication session that is to be rekeyed. The method further includes determining, by the first IKE node, whether the IPSec communication session is installed locally at the first IKE node for communication with a client device and when the IPSec communication session is installed locally at the first IKE node, initiating a rekeying process, by the first IKE node.

Example Embodiments

In cloud-scale virtual private networks (VPNs), the IKE functionality, which serves as the control plane for the IPSec sessions, is independently and horizontally scaled by having a number of IKE nodes or instances. The IKE nodes are treated as "cattle" (i.e., if one of the IKE nodes experiences errors or fails, it is "killed" and replaced with another IKE node). This means that any IKE node can handle any IKE or ESP session. However, requiring that a given single IKE node handle the entire rekey process from start to finish makes these nodes less like cattle and more like "pets" (i.e., a particular IKE node that is essential, and must be maintained or restored in the event of errors or failures), the antithesis of cloud native networking. This also limits the IPSec sessions to only being able to be stored on local instantiations, meaning they are not truly distributed.

In example embodiments, the rekeying process is split among the IKE nodes. That is, example embodiments provide for rekey events for both IKE and ESP sessions to be handled by any IKE node in, for example, a cloud-native VPN installation, in which IKE nodes have been horizontally scaled (i.e., in which there are two or more IKE nodes configured to handle any IKE or ESP session in the environment). Accordingly, example embodiments provide for dynamic rekeying of IKE and ESP sessions in which the rekey processing is split across nodes in the middle of the rekey event itself, allowing for more dynamic rekey events and cloud-native IPSec in terms of the rekeying of session tunnels. Example embodiments allow the operator to initiate rekeying process on any IKE node regardless of the IKE node actually handling the IKE and ESP sessions. Example embodiments allow any IKE node to handle the rekeying process regardless of which IKE node handles the IKE and ESP sessions.

FIG. 1 is a block diagram illustrating an IPSec architecture 100 configured to implement a key negotiation process, according to an example embodiment. In FIG. 1, the IPSec architecture 100 shows the IKE and ESP processing split into separate ESP nodes 114a-e and IKE nodes 116a-d, effectively splitting the control and data plane processing of an IPSec tunnel. This splitting of the IKE and ESP processing may be referred to as just-in-time IKE (JITIKE) and just-in-time security (JITSEC), respectively. Splitting the control and data plane processing permits scaling of the control and data plane aspects of IPSec independently. The number of ESP nodes 114a-e and the number of IKE nodes 116a-d will vary depending on a particular implementation. For example, there may be as many as 64 IKE nodes 116a-d.

As illustrated in FIG. 1, the IKE servers or IKE nodes 116a-d are scaled horizontally, meaning there are a plurality of IKE servers or IKE nodes 116a-d that may service the connections between a user 106 and an environment 108. The user 106 is an endpoint or a client device such as a computer. The environment may be embodied as a public network, such as the internet, or in a form of one or more private networks. The user 106 communicates with the environment 108 via one of the ESP nodes 114a-e using a User Data Protocol (UDP) or another ESP protocol such as protocol 50. The UDP may use a port 4500 but these are provided by way of an example and not by way of a limitation. The user 106 also communicates with one of the IKE nodes 116a-d (e.g., servers) to establish a security association. For example, a UDP protocol or another IKE protocol such as protocol 51 may be used. The UDP may use a port five hundred. For example, the user 106 will indicate to the IKE server that I am user X with a password Y. The user 106 may propose to use these encryption algorithms and keys, and negotiate a time for refreshing the keys (e.g., 30 min).

The use of a key value store (K/V store) 118 allows for both the horizontal scaling of IKE servers or IKE nodes 116a-d and the rekeying of an IPSec connection to be initiated by and executed across two or more of IKE servers or IKE nodes 116a-d, not just a given IKE server currently servicing an IPSec connection between an endpoint of the user 106 and the environment 108. The K/V store 118 is a device such as a database that is, e.g., maintained separately from all of IKE servers or IKE nodes 116a-d while all of the IKE servers or IKE nodes 116a-d have access to the IKE data contained in the K/V store 118. The K/V store 118 is configured to store SA data for all of the IPSec traffic, both IKE and ESP, serviced by IKE nodes 116a-d and ESP nodes 114a-e. Accordingly, the SA data associated with the IPSec connection between the user 106 and the environment 108 may be accessed by any of IKE servers or IKE nodes 116a-d.

When there is only a single IKE node, rekey events for both IKE and ESP tunnels are handled by this single IKE node i.e., the single IKE server. The single IKE node will handle the rekeying of both IKE and ESP tunnels from start to finish. Once an IPSec IKE SA lands on an IKE node, the IKE node is responsible for handling the rekeying of the IKE and ESP tunnels. In other words, once an IKE server node has an IKE tunnel or session, it handles the entire process of rekeying both IKE and ESP sessions or tunnels. IPSec connection or session refers to either one of an IKE session or tunnel and an ESP session or tunnel.

Figure 2:
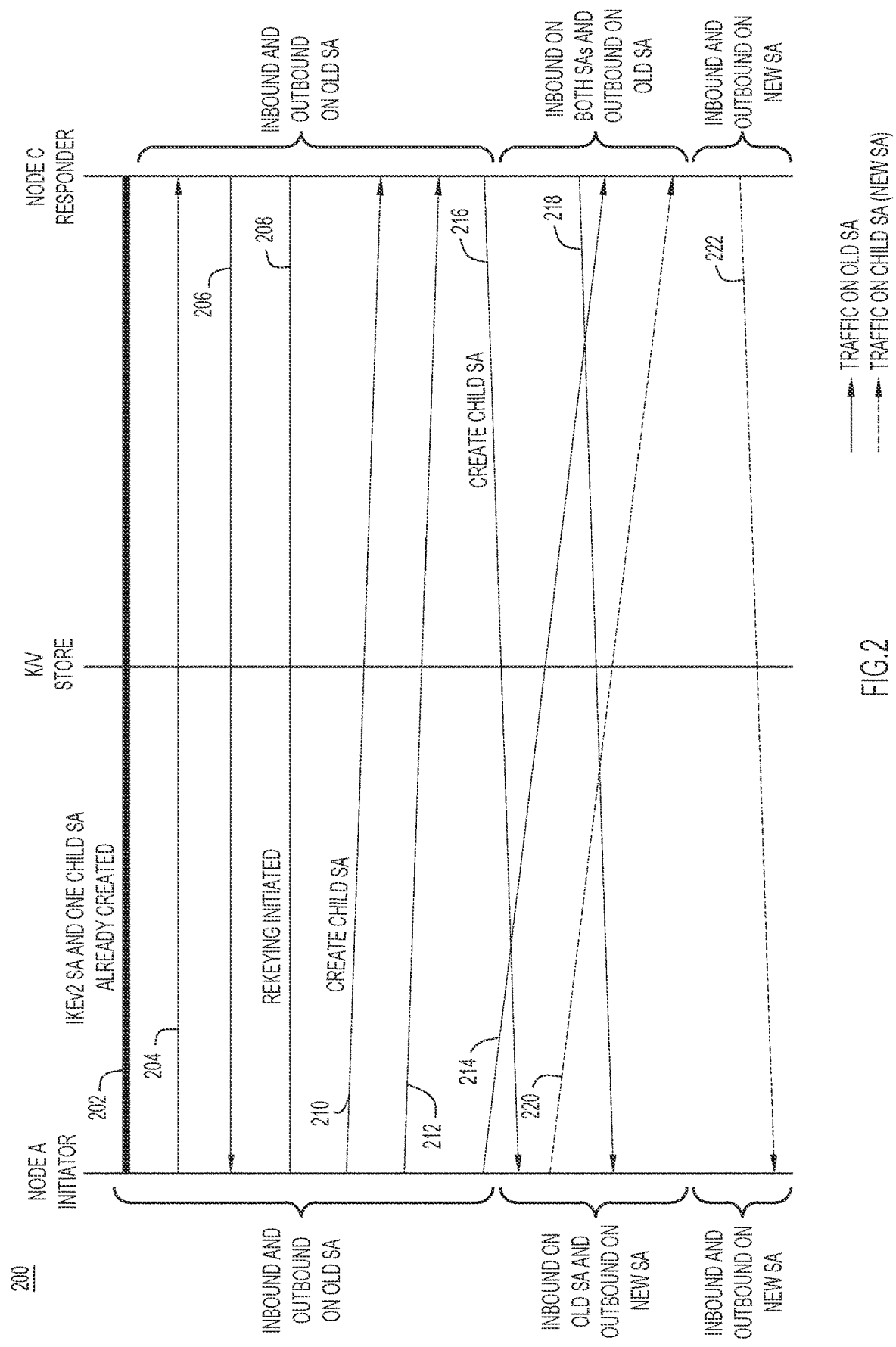
FIG. 2 is a ladder diagram illustrating an IPSec key negotiation in a single IKE server environment, according to an example embodiment.

More specifically, FIG. 2 is a ladder diagram illustrating an IPSec key negotiation process 200 in a single IKE server environment, according to an example embodiment. In FIG. 2, the rekeying process is between node A initiator and node B responder. Either node A or node C may be embodied as the IKE server (one of the IKE servers or IKE nodes 116a-d in FIG. 1) and either the IKE node or the endpoint device (user 106 in FIG. 1) may initiate the IKE rekeying. A K/V store may store information about the IPSec session or tunnel and SA associated with the IPSec session, as explained in further detail below. The K/V store may be the K/V store 118, shown in FIG. 1.

During the rekeying, both the initiator node and the responder node maintain both SAs for some duration during which they can receive (inbound) traffic on both SAs. The inbound traffic on the old SA stops only after each node unambiguously knows that the peer is ready to start sending on the new SA (switch outbound to new SA).

As illustrated in the IPSec key negotiation process 200, traffic 202, 204, 206 is initially sent between the initiator node A and the responder node C. According to the example depicted in FIG. 2, it is assumed that the initiator node A is the IKE server and it is further assumed that a new SA (or child SA, used interchangeably) has been generated. In operation 208, a rekeying is initiated, and messages 210-220 are exchanged between the initiator node A and the responder node C.

Specifically, message 210 initiates the rekeying process but is sent using the old SA, as illustrated through the solid line associated with the message 210. Message 212 indicates that the child SA has been created at the initiator node A and message 214 is an example of a message sent after the creation of the child SA. As indicated through the solid lines associated with messages 212 and 214, both messages are sent using the old SA. Message 216 indicates that the child SA has been created at the responder node C, but is sent using the old SA, as illustrated through the solid line associated with the message 216. Like message 214, message 218 is an example of a message sent after the creation of the child SA but that is still sent using the old SA, as illustrated through the solid line associated with message 218. Message 220, on the other hand, is sent using the child SA, as illustrated through the dashed line associated with the message 220. Message 220 is sent using the new SA because it is sent after receipt of message 216, which indicated that the child SA had been created at responder node C. Message 220 may indicate, for example, that the old SA has been deleted at initiator node A. According to other examples, the message 220 may serve as another type of control message, such as an IKE version 2 (IKEv2) message indicating a dead peer detection. Next, message 222 is sent using the child SA, as illustrated through the dashed line associated with the message 222, as will subsequent traffic sent between the initiator node A and the responded node C. As illustrated in the IPSec key negotiation process 200, the entire rekeying process takes place with a single IKE node, in this case, the initiator node A.

Figure 3:
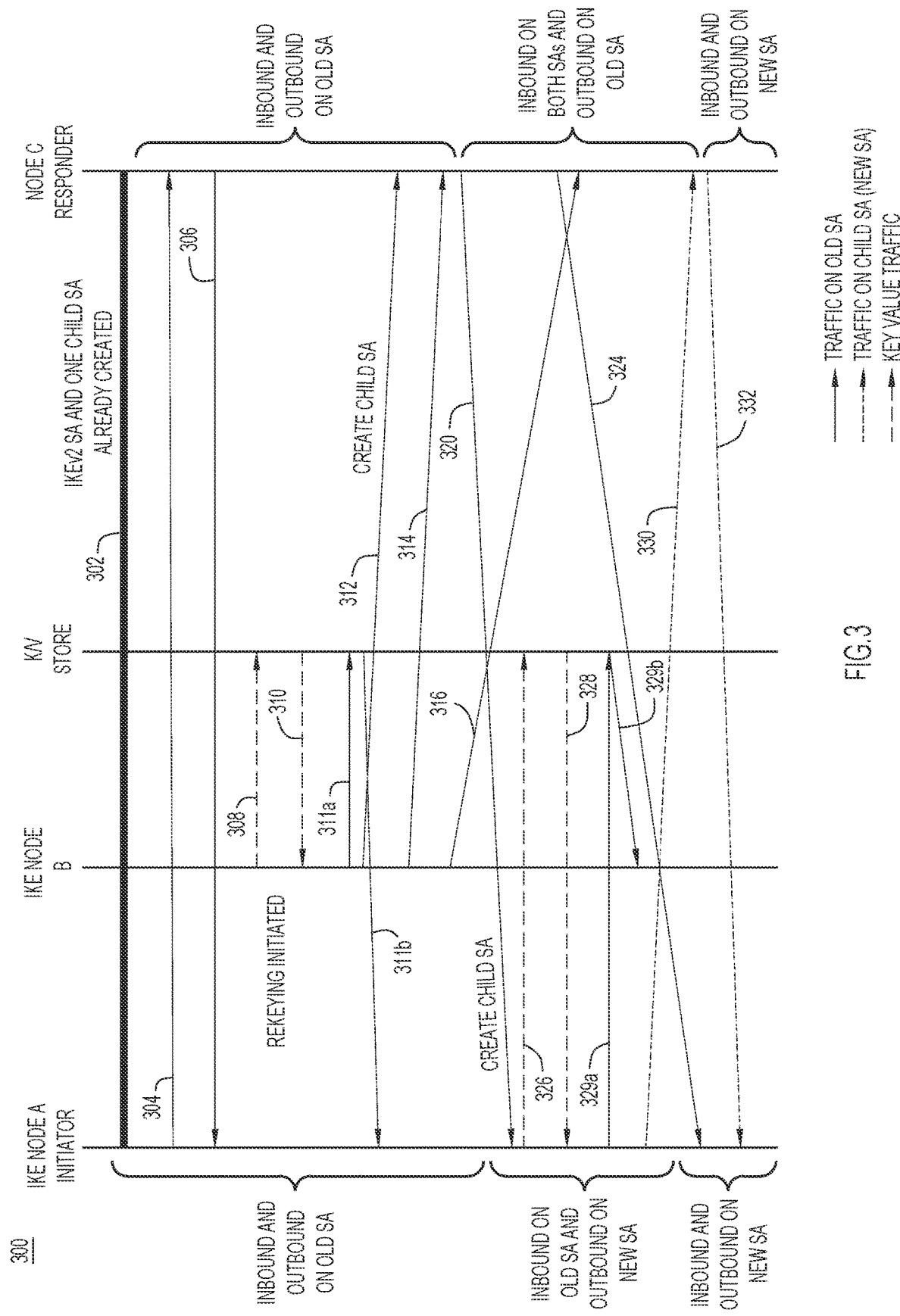
FIG. 3 is a ladder diagram illustrating a decentralized IPSec key negotiation, according to an example embodiment.

FIG. 3 is a ladder diagram illustrating a decentralized IPSec key negotiation 300, according to an example embodiment. In FIG. 3, the rekeying process is between multiple IKE servers (IKE servers or IKE nodes 116a-d in FIG. 1) depicted as IKE node A Initiator and IKE node B in FIG. 3. The multiple IKE servers or IKE nodes communicate with the K/V store (such as the K/V store 118) to obtain information about the IPSec session or tunnel and to obtain SA associated with the IPSec session. The node C responder is the endpoint device (user 106 in FIG. 1). Either one of the IKE nodes or node C responder or a responder node (the endpoint device) may initiate the IKE rekeying. In the event the rekeying is initiated by a node C responder, due to hashing, the rekeying request initiated by the node C responder may be received by any of the IKE nodes such as IKE node B in FIG. 3.

As noted above, the rekeying process may be initiated by an endpoint device or any of the IKE nodes. The rekeying process may also be triggered by the data itself. For example, when an IPSec tunnel is migrating between the servicing data nodes (ESP nodes 114a-e), this may trigger the rekeying process. The rekeying process may be triggered as a result of a timeout occurring at the endpoint device or at an IKE node that is supporting the IPSec tunnel. The timeout may be based on a quantity of data transmitted e.g., reset the key every 2 gigabyte (GB) over the IPSec tunnel and/or based on a time period, e.g., reset the key every 30 minutes. A predetermined period of time for rekeying may be negotiated at a time of establishing an IPSec session (FIG. 1). Also, an administrator or a user 106 (FIG. 1) may request the rekeying process at will.

Referring back to FIG. 3, in the decentralized IPSec key negotiation 300, traffic 302, 304, and 306 is initially sent between the initiator IKE node A and the node C responder using the old SA. Using a message 308, a rekeying is initiated from an IKE node B. The rekeying may be initiated based on any of the triggering events described above. The rekeying event is initiated via a versatile IKE configuration interface (VICI) application interface (API) from the IKE node B. Since the IKE node B is not initially part of the IPSec tunnel or session between the IKE node A and the node C responder, the IKE node B generates and sends the message 308 to the K/V store. The message 308 requests from the K/V store data associated with the old SA currently being utilized by the IKE node A and the node C responder. The K/V store pulls IPSec session information and the associated old SA and provides the information to the IKE node B via a message 310. Based on the received message 310, the IKE node B loads the IPSec session locally and publishes an event (via a message 311a) to the K/V store that forces the IKE node A to remove the IPSec session locally, via a message 311b, sent by K/V store.

With the IPSec session installed on the IKE node B and the keying information associated with the old SA in hand, the IKE node B sends a message 312 indicating that a rekeying has been initiated to create a child SA (new SA), and a message 314 is an example IKEv2 control message sent after creation of the child SA, both messages being sent using the old SA, as indicated through the solid line associated with messages 312 and 314. Message 316 is an example IKEv2 control message illustrating that traffic outbound to the node C responder (inbound from the IKE node B) may be received using the old SA even after the creation of the child SA through message 320, described in greater detail below.

Node C responder responds to the message 312 via a response message (message 320). Notably, an equal cost multi-path routing (ECMP) algorithm may direct the message 320 to a different IKE node than the IKE node B. That is, a response from the Node C responder may be hashed onto any of the IKE nodes based on various hashing algorithms. As a result, a different IKE node may continue the rekeying process with the node C responder. In FIG. 3, the message 320 is sent from node C responder and is hashed to the IKE node A. The message 320 indicates to the IKE node A that the child SA has been created, but this message is sent using the old SA, as indicated through the solid line associated with message 320. The message 320 may include data indicative of the child SA previously created by the IKE node B. Like message 316, a message 324 is an example IKEv2 control message illustrating that traffic outbound from the node C responder (inbound to the IKE node A) may be received using the old SA even after the creation of the child SA.

Because the IKE node A did not initiate the rekeying and removed the IPSec session, it does not have the key values associated with the child SA until the receipt of the message 320. Accordingly, the IKE node A reconciles the data received in the message 320 with the data contained in the K/V store via messages 326 and 328. These messages result in the child SA being stored in K/V store and the IKE node A loading the IPSec session locally. As part of this process, the IKE node A also publishes an event (message 329a) to the K/V store so that the IKE node B removes the IPSec session installed locally at the IKE node B, via message 329b. Now in possession of the appropriate keys for the child SA, the IKE node A sends a message 330 using the child SA. Like messages 314, 316, and 324, message 330 may be an example IKEv2 control message. Unlike messages 314, 316 and 324, the message 330 is sent using the child SA, as indicated by the dashed line associated with the message 330. The message 330 is sent using the child SA because is it sent after receipt of the message 320, which indicated the creation of the child SA at the node C responder and after the child SA is established at the IKE node A through messages 320, 326, and 328. Message 332 is, for example, an IKEv2 control message sent from the node C responder to the IKE node A using the child SA. Furthermore, because the IKE node A retrieved the child SA keys from K/V store, the IKE node A may decrypt and process the message 332, received from the node C responder using the child SA.

In other words, a decentralized IPSec key negotiation 300 of FIG. 3 may be described as follows. An existing IKE session is instantiated on the IKE node A that is communicating with the node C responder (messages or traffic 302, 304, and 306). A rekey event is then initiated from the IKE node B for the IKE session existing on IKE node A that is used to send messages to the node C responder. The IKE node B does not know about the IKE session, so it searches the key/value store for this session (per the system described with reference to FIG. 1, all IKE sessions are stored in a K/V store), (the message 308). The IKE node B finds the session in the K/V store and installs it locally (message 310). As part of this (messages 311a and 311b), the IKE node B also publishes an event to the K/V store such that the IKE node A removes the locally installed IKE session. Then, the IKE node B initiates the rekey for the now-locally installed IKE session (message 312). The node C responder sends a rekey response (message 320) back, and it lands on the IKE node A due to ECMP (by way of an example). Other load balancing and/or traffic routing techniques may also be used to route the rekey response to the IKE node A or another node. The ECMP is just one example of these techniques and the IKE node A is used by way of an example. The load balancing and/or traffic routing techniques may hash the rekey response to any of the IKE nodes.

Since, the IKE node A previously removed the IKE session, it now does not know about the IKE session. As such, the IKE node A searches the K/V store and finds the IKE session, installing it locally (messages 326 and 328). As part of this process (messages 329a and 329b), the IKE node A also publishes an event to the K/V store such that IKE Node B will remove the IKE locally. The IKE node A will store the reconciled new SA in the K/V store once the rekey is complete. The IKE node A continues the rekeying process, sending another response with the new SA key to the node C responder (message 330). The node C responder finishes the rekey process by sending a response which lands on IKE Node A (message 332). The old keys are removed from both the IKE node A and the node C responder.

While FIG. 3 illustrates a rekeying process in which two IKE nodes participate (IKE node A and IKE node B), as noted above, there is no limit on how many IKE nodes may be used in the rekeying processes of various example embodiments. Example embodiments may utilize three or more IKE nodes, and the total number of IKE nodes may expand into the tens of nodes or more. In theory, each packet in the rekey sequence may be handled by a different node. The diagrams above show a Child or ESP SA rekeying. The same process applies for IKE rekeying, the techniques of exemplary embodiments include both IKE and ESP rekeying processes. The techniques of exemplary embodiments allow for the treatment of IKE nodes as "cattle," even during the rekeying process. The techniques of exemplary embodiments also enable rekey events to be split across IKE nodes on a per-packet basis as packets arrive or as the rekey is initiated from the operator.

Figure 4:
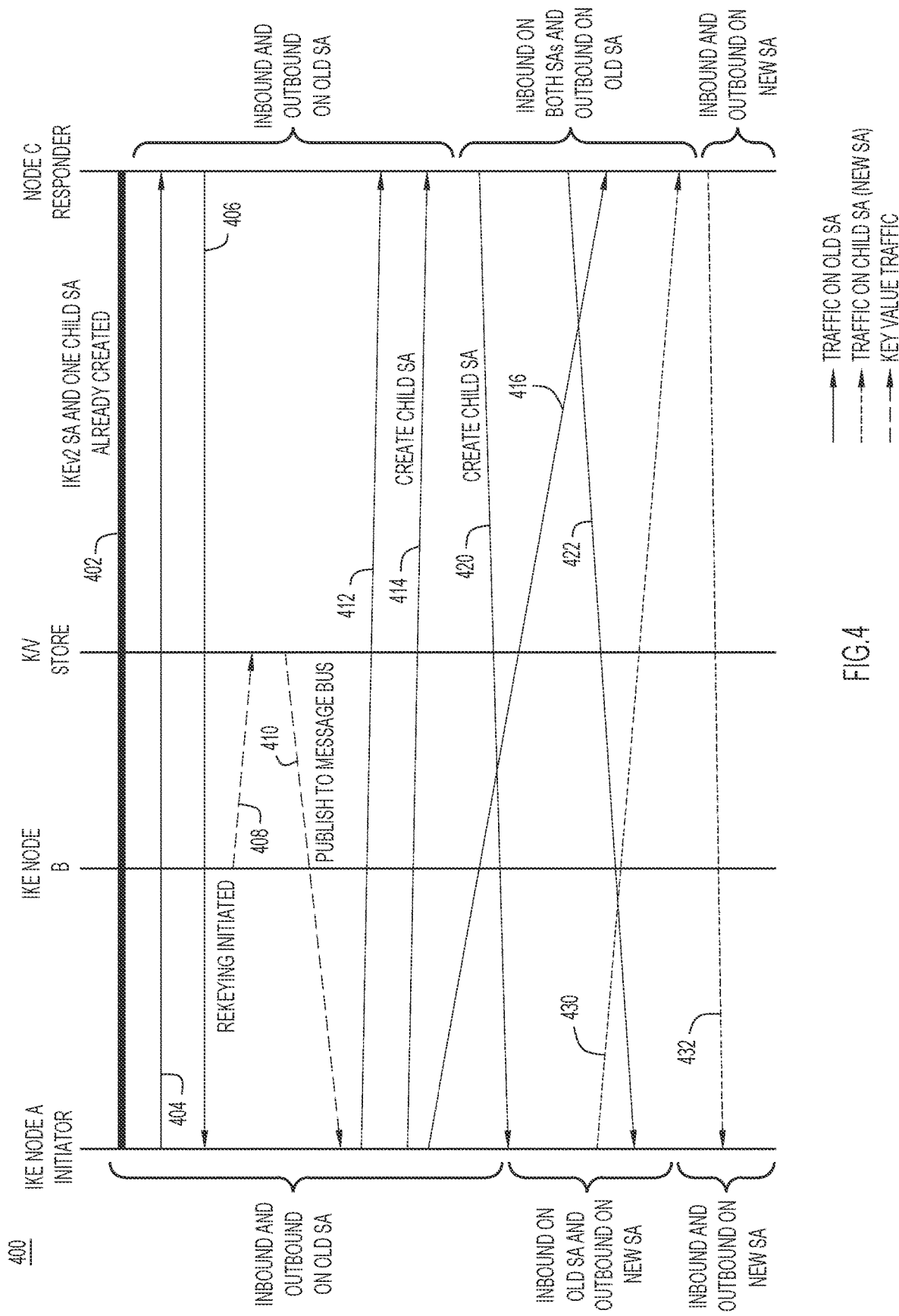
FIG. 4 is a ladder diagram illustrating a decentralized IPSec key negotiation, according to another example embodiment.

FIG. 4 is a ladder diagram illustrating a decentralized IPSec key negotiation 400, according to another example embodiment. In FIG. 4, the same entities as the ones described above with reference to FIG. 3 participate in the rekeying process. Accordingly, detailed descriptions of the entities is omitted for the sake of brevity.

In the decentralized IPSec key negotiation 400, similar to the decentralized IPSec key negotiation 300 of FIG. 3, traffic in messages 402, 404, and 406 is initially sent between the IKE node A initiation and the node C responder using the old SA, even though a new SA (one child SA) was already created or generated. Using a message 408, a rekeying is initiated from a second IKE node. The rekeying may be initiated based on any of the triggering events described above. The rekeying event may be initiated via a VICI API from the IKE node B. Since the IKE node B does not know about the IKE session between the IKE node A and the Node C responder, the IKE node B generates and sends a message 408 to the K/V store. The message 408 is an event with new SA information therein. Based on the message 408, the K/V store generates an event with details about the IKE or child SA session to rekey. The event is published by the K/V store onto a message bus to which all the IKE nodes subscribe or listen to. All of the IKE nodes (IKE node A and IKE node B) subscribe to the events from the K/V store and as such, receive the published event in 410. Although FIG. 4 depicts the published event 410 received by the IKE node A, in example embodiments, the published event 410 is a broadcast or a multicast message that indicates information about an IKE session and the new SA. Each IKE node that receives the event 410 will check if it has the child or IKE SA installed locally. If the IKE node does not have the child or the IKE SA installed locally, the event is discarded or ignored. On the other hand, if the IKE node such as IKE node A in FIG. 4 has the child or the IKE SA installed locally, it starts the rekeying process.

With the IKE session installed on the IKE node A, the IKE node A sends a message 412 which is an example of IKEv2 control message sent after the creation of the child SA. The IKE node A further sends a message 414 indicating that a rekeying has been initiated to create a child SA (new SA), and a message 416 which is another example of IKEv2 control message sent after the creation of the child SA, all these three messages (412, 414, and 416) are sent using the old SA, as indicated through the solid line associated with messages 412, 414, and 416.

Node C responder responds to the message 412 via a rekey response (message 420). An equal cost multi-path routing (ECMP) algorithm may direct the message 420 to the IKE node A, in the example embodiment in FIG. 4. As explained above, a response from the Node C responder may be hashed onto any of the IKE nodes based on various hashing algorithms. However, due to ECMP, the rekey response (message 420) lands on the IKE node A. The message 420 indicates that a child SA was created by the node C responder. Message 422 is an example IKEv2 control message illustrating that traffic outbound from the node C responder (inbound to the IKE node A) may be received using the old SA even after the creation of the child SA.

The IKE node A continues the rekeying process, sending another response with a new child SA key to the Node C responder, message 430. The message 430 may be an example IKEv2 control message. Unlike messages 422, the message 430 is sent using the child SA, as indicated by the dashed line associated with the message 430. The message 430 is sent using the child SA because is it sent after receipt of the message 420, which indicated the creation of the child SA at the node C responder. A message 432 is, for example, an IKEv2 control message sent from the node C responder to the IKE node A using the child SA. Furthermore, because the IKE node A has the child SA keys, the IKE node A may decrypt and process the message 432, received from the node C responder using the child SA.

In other words, the decentralized IPSec key negotiation 400 of FIG. 4 may be described as follows. The existing IKE session is instantiated on the IKE node A, communicating with node C responder (messages 402, 404, and 406). A rekey event is initiated via, e.g., the VICI API from the IKE node B. The IKE node B does not know about the IKE session, so it generates an event over the publish/subscribe bus with the details on the IKE or CHILD SA session to rekey (messages 408 and 410). The IKE node A receives the pub/sub event, and it has the CHILD or IKE SA installed locally, so it starts the rekeying process (message 414). The node C responder sends a rekey response back, and it lands on the IKE node A due to ECMP (message 420). The IKE node A continues the rekeying process, sending another response with the new child SA key to the node C responder (message 430). The node C responder finishes the rekeying process by sending a response which lands on the IKE node A again due to the ECMP (message 432). The old keys are removed from both the IKE node A and node C responder.

According to example embodiments of FIG. 4, the IKE node that handles the IPSec session is the one that initiates the rekeying process with the node C responder, thereby providing for a faster and less complex approach. Since a rekey event is generated and published to the message bus or channel, there is no need to remove the IPSec session from one IKE node and install that IPSec session at a different IKE node. These operations may be omitted.

In some example embodiments of FIG. 4, the message 420 from the node C responder may be hashed onto a different IKE node and not the IKE node A. In this case, the decentralized IPSec key negotiation 400 may include messages 326 and 328 described with reference to FIG. 3.

Although not shown, in example embodiments of FIGS. 3 and 4, the message 332 and the message 432, respectively, may also be hashed to a different IKE node (e.g., IKE node D, not shown). In this case, the IKE node D will communicate with the K/V store to obtain information about the IKE session and continue the rekeying process. That is, the IKE node D will send a message such as the message 326 and receive a response such as the message 328, based on which, it can take over the IKE session.

Once the rekeying process is complete, the new key is used to communicate traffic across the IPSec tunnel with the node C responder. If there is traffic on the IPSec tunnel or IPSec communication channel, the IKE node is assumed to be alive and functioning. However, when there is no traffic across the IKE node for a predetermined period of time, a dead peer detection (DPD) method may be executed or performed to detect whether the IKE node is still alive or whether it is dead. The DPD method is used to confirm the availability of an IKE node and used to reclaim resources in case the IKE node is found dead or has failed. A static or centralized dead peer detection mechanism is defined in an Internet Engineering Task Force (IETF) Request for Comments (RFC) 3706 and may be applied when there is a single IKE node, as described with reference to FIG. 2.

According to an example embodiment, dynamic dead peer detection is provided to determine whether an IKE node from among a number of IKE nodes is still alive. For example, when a session is established with one (e.g., IKE node A) of multiple IKE nodes, as described with reference to FIGS. 3 and 4, this IKE node (IKE node A) may need to be rolled. That is, the IKE node A is taken down and a new IKE node is provided in its place. Since there may only be ESP traffic over an IPSec communication tunnel and no IKE traffic at the time of the switch, the IKE node A session is never terminated. Subsequent IKE traffic will be handled by the new IKE node but the IPSec communication session with the IKE node A is still existing in the k/v store. Using the dead peer detection, the IPSec communication sessions may be forced out the of the K/V store for termination, debugging, or the rekeying process. In an example embodiment, an IPSec communication session is proactively forced out of the K/V store onto one of the IKE nodes for further processing.

Figure 5:
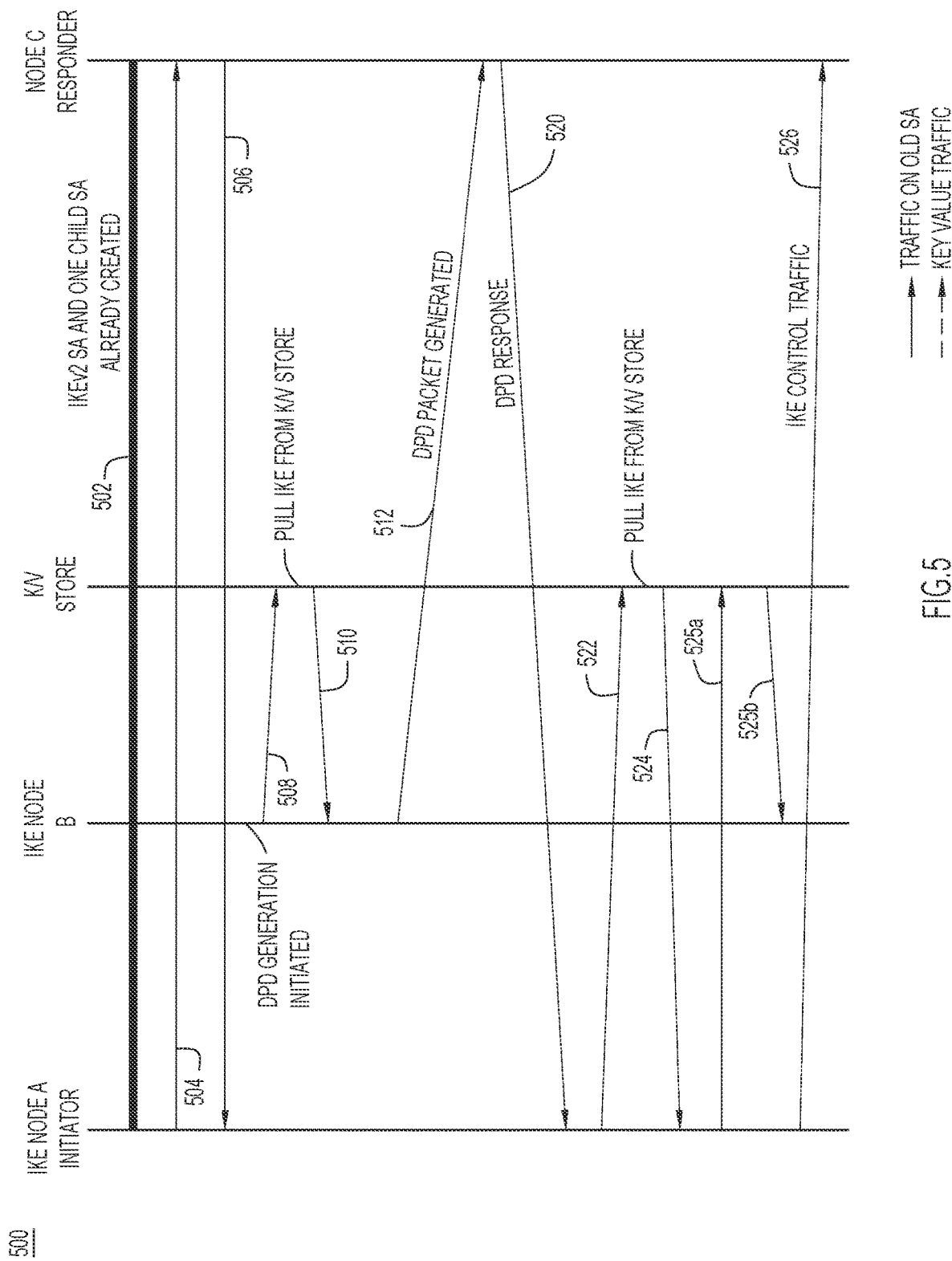
FIG. 5 is a ladder diagram illustrating a decentralized IPSec dead peer detection generation, according to an example embodiment.

FIG. 5 is a ladder diagram illustrating a decentralized IPSec dead peer detection process 500, according to an example embodiment. In FIG. 5, the same entities as the ones described above with reference to FIGS. 3 and 4 participate in the decentralized IPSec dead peer detection process 500. Accordingly, detailed descriptions of the entities is omitted for the sake of brevity.

The decentralized IPSec dead peer detection process 500 is a decentralized IPSec dead peer detection technique, similar to the decentralized IPSec key negotiation 300 of FIG. 3 and the decentralized IPSec key negotiation 400 of FIG. 4, traffic in messages 502, 504, and 506 is initially sent between the IKE node A initiation and the node C responder using a new SA (one child SA) that was already created or generated. However, at some point, the IPSec communication session no longer has any traffic over it and may only exist in the K/V store. For example, due to a virtual machine migration process, the IKE node A may have been rolled.

In FIG. 5, the dead peer detection may still be generated or initiated even if the IPSec session only exists in a K/V store. Further, the dead peer detection process is decentralized and may be handled by various IKE nodes. That is, the dead peer detection process may be split among multiple IKE nodes.

Additionally, the dead peer detection may be initialized based on an input from an operator or based on a predetermined threshold. For example, an operator may view IPSec sessions in the K/V store and may request that an IPSec session A be locally installed on one of the IKE nodes. The operator's request may be hashed onto an IKE node B according to an example in FIG. 5. According to yet another example, a monitoring node or device (such as one of the client or endpoint device of the user 106 in FIG. 1) may be provided, which monitors the IPSec communication sessions stored in the K/V store and based on a predetermined threshold or criteria forces the IPSec communication session to be installed locally on one of the IKE nodes. For example, based on detecting that the IPSec communication session remains idle or non-operational (not loaded on any IKE nodes) for a predetermined period of time, the monitoring node may request the IKE nodes to load the session and initiate a DPD generation process. The request is hashed onto one of the IKE nodes and the DPD generation is initiated.

In FIG. 5, the operator or the monitoring node's request for an IPSec communication session is hashed onto the IKE node B. In response, the IKE node B is forced to pull the IPSec communication session from the K/V store (messages 508 and 510). That is, the dead peer detection event is initiated via the VICI API from the IKE node B. The IKE node B locally installs or instantiates the IPSec communication session such as the IKE session and generates a dead peer detection packet. The dead peer detection packet is communicated to the node C responder (message 512). The node C responder sends a dead peer detection response (message 520) back to the IKE node B but it lands on the IKE node A due to ECMP, for example. The IKE node A continues the dead peer detection. Since the IKE node A does not know the IKE session, the IKE node A searches the K/V store and finds the IKE session, installing it locally (messages 522 and 524). As part of this (messages 525a and 525b), the IKE node A also publishes an event to the K/V store such that IKE Node B will remove the IKE locally. The IKE node A continues the dead peer detection, sending further IKE control traffic to the node C responder (message 526). Further IKE control traffic may include control traffic related to debugging in the IKE session, control traffic related to rekeying the IKE session, or control traffic related to terminating the IKE session.

In other words, the decentralized IPSec dead peer detection process 500 of FIG. 5 may be described as follows. The IKE session is instantiated on IKE Node A, communicating with responder node C (messages 502, 504, and 506). A DPD generation event is initiated via the VICI API from IKE Node B. The IKE Node B does not have the IKE session loaded, and so it searches the K/V store for the IKE session and loads the IKE session locally (messages 508 and 510). As part of this dead peer detection process, the IKE Node B also publishes an event to the K/V store such that the IKE Node A will remove the IKE locally (if it is still installed locally) based on receiving the message. If the IKE session only exists in the K/V store, there is no need to publish the event (these messages may then be omitted), as shown in FIG. 5. The IKE node B then generates a dead peer detection packet to the node C responder (message 512). The node C responder responds to the IKE dead peer detection packet (message 520). The ECMP direct the response packet to the IKE node A. Since the IKE node A does not know about the IKE session, it searches the K/V store for the IKE session, finds the IKE session, and installs it locally (messages 522 and 524). As part of this process, the IKE node A also publishes an event to the K/V store such that IKE Node B will remove the IKE session installed locally at the IKE node B (messages 525a and 525b). The IKE control traffic is now handled from the IKE node A to the node C responder (message 526).

Figure 6:
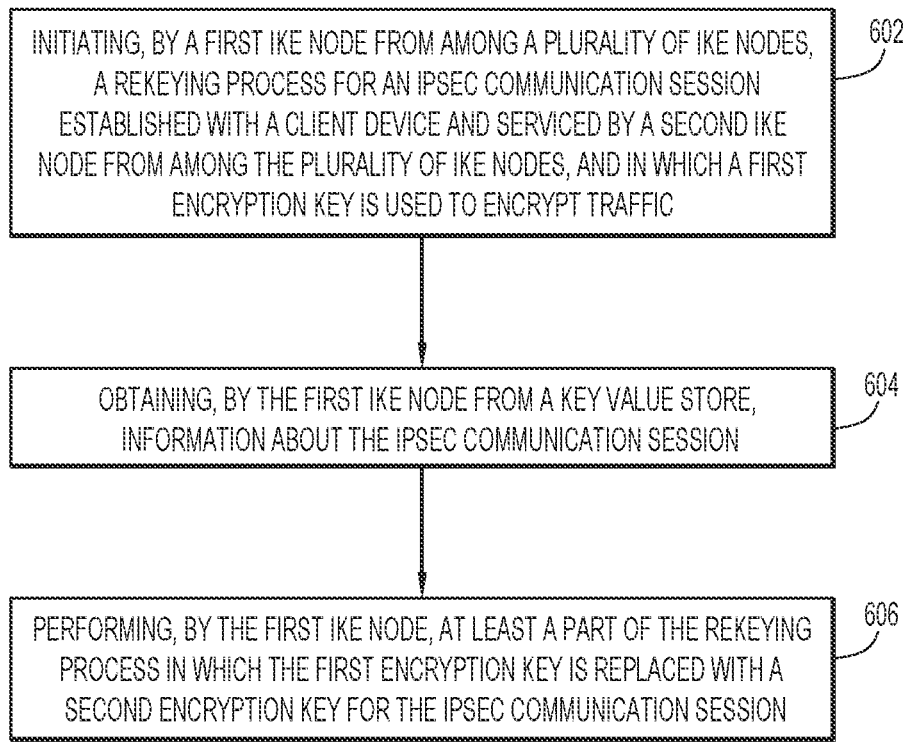
FIG. 6 is a flowchart illustrating a method of a decentralized IPSec key negotiation performed by an IKE node device, according to an example embodiment.

FIG. 6 is a flowchart illustrating a method 600 of a decentralized IPSec key negotiation performed by an IKE node device, according to an example embodiment. The method 600 is performed by one of the IKE servers or IKE nodes 116a-d described above with reference to FIG. 1 or one of the IKE nodes described above with reference to FIGS. 3 and 5.

At 602, the first IKE node from among a plurality of IKE nodes, initiates a rekeying process for an IPSec communication session established with a client device and serviced by a second IKE node from among the plurality of IKE nodes. In the IPSec communication session, the traffic is encrypted using a first encryption key.

At 604, the first IKE node obtains, from a key value store, information about the IPSec communication session. At 606, the first IKE node performs at least a part of the rekeying process in which the first encryption key is replaced with a second encryption key for the IPSec communication session.

According to one or more example embodiments, the obtaining operation 604 in which the information about the IPSec communication session is obtained by the first IKE node from the key value store includes retrieving, by the first IKE node from the key value store, the first encryption key. The obtaining operation 604 in which the information about the IPSec communication session is obtained by the first IKE node from the key value store further includes installing locally, by the first IKE node, the IPSec communication session based on the information about the IPSec communication session and publishing, by the first IKE node to the key value store, an event message indicating that the IPSec communication session is installed locally on the first IKE node so that the IPSec communication session is removed from the second IKE node.

According to one or more example embodiments, the performing operation 606 in which the first IKE node performs at least a part of the rekeying process in which the first encryption key is replaced with the second encryption key for the IPSec communication session, may include providing, by the first IKE node to the client device, an IKE control message using the first encryption key indicating that the second encryption key is generated and communicating, by the first IKE node with the client device, using the first encryption key to encrypt the traffic of the IPSec communinication session. The traffic includes at least one of a data message or a control message.

According to one or more example embodiments, the method 600 may further include receiving, by the first IKE node from the client device, a response message indicating that the client device generated the second encryption key for the IPSec communication session and in response to the response message, encrypting, by the first IKE node, the traffic of the IPSec communication session using the second encryption key.

According to one or more exemplary embodiments, the method 600 may further include continuing the IPsec communication session using the second encryption key based on receiving, from the client device, a response message indicating that the second encryption key is generated for the IPSec communication session. The response message is hashed to one IKE node from among the plurality of IKE nodes except for the first IKE node.

According to one or more example embodiments, the IPSec communication session is one of an IKE session or an encapsulating security payload (ESP) session.

According to one or more example embodiments, the method may further include prior to completing the rekeying process, removing, by the first IKE node, the IPSec communication session that is locally installed on the first IKE node.

FIG. 7 is a flowchart illustrating a method 700 of a decentralized IPSec key negotiation performed by a key value store device or using a key value store device by a communication channel, according to an example embodiment. The method 700 is performed by a K/V store 118 described above with reference to FIG. 1 or one of the K/V stores described above with reference to FIGS. 3 and 5.

At 702, the key value store device obtains, from a first Internet Key Exchange (IKE) node from among a plurality of IKE nodes, a first message indicating that an IPSec communication session needs to be rekeyed. The IPSec communication session is established with a client device and is serviced by a second IKE node.

At 704, the key value store device provides to the first IKE node, information about the IPSec communication session including a security association to enable the first IKE node to locally install the IPSec communication session so as to initiate a rekeying process and so as to remove the IPSec communication session from the second IKE node.

According to one or more example embodiments, the method 700 may further include the key value store device obtaining from another IKE node from among the plurality of IKE nodes, a request for the IPSec communication session locally installed at the first IKE node. The method 700 may further include the key value store device providing, to the another IKE node, the information about the IPSec communication session including the security association to enable the another IKE node to locally install the IPSec communication session so as to continue the rekeying process and the key value store device obtaining, from the another IKE node, an event so as to remove the IPSec communication session from the first IKE node. The rekeying process includes replacing the security association for the IPSec communication session with a new or child security association.

According to one or more example embodiments, the method 700 may further include the key value store device obtaining, from the another IKE node, the new or child security association for the IPSec communication session and the key value store device updating the information about the IPSec communication session with the new or child security association. The IPSec communication session is an IKE session or an encapsulating security payload session.

Figure 8:
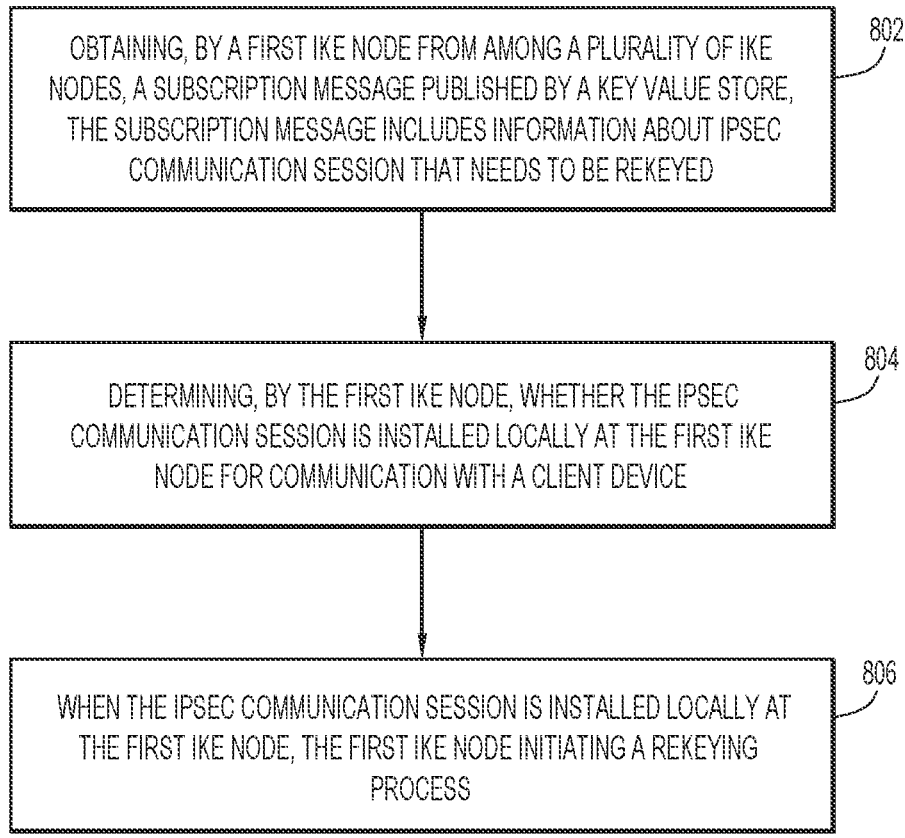
FIG. 8 is a flowchart illustrating a method of a decentralized IPSec key negotiation performed by an IKE node device, according to another example embodiment.

FIG. 8 is a flowchart illustrating a method 800 of a decentralized IPSec key negotiation performed by an IKE node device, according to another example embodiment. The method 800 may be performed by K/V store 118 described above with reference to FIG. 1 or the K/V store described above with reference to FIG. 4 or FIG. 5.

At 802, a first IKE node, from among a plurality of IKE nodes, obtains a subscription message published by a key value store. The subscription message includes information about an IPSec communication session that needs to be rekeyed.

At 804, the first IKE node determines whether the IPSec communication session is installed locally at the first IKE node for communication with a client device and at 806, when the IPSec communication session is installed locally at the first IKE node, initiating a rekeying process, by the first IKE node.

According to one or more example embodiments, the method 800 may further include the first IKE node obtaining another subscription message published by the key value store. This other subscription message includes information about another Internet Protocol Security (IPSec) communication session that needs to be rekeyed. The method 800 may further include the first IKE node discarding the another subscription message without initiating the rekeying process based on the IPSec communication session determined not to be installed locally at the first IKE node. This other subscription message is published to a channel to which the plurality of IKE nodes subscribe.

According to one or more example embodiments, the obtaining operation 802 in which the first IKE node, from among a plurality of IKE nodes, obtains a subscription message published by a key value store, may include obtaining, by the first IKE node, the subscription message that is generated based on a request to rekey the IPSec communication session provided to the key value store by a second IKE node from among the plurality of IKE nodes.

According to one or more example embodiments, the initiating operation 806 in which the first IKE node initiates the rekeying process when the IPSec communication sessions is installed at the first IKE node, may include providing, by the first IKE node to the client device, a control message indicating that the rekeying process of the IPSec communication session is initiated. The rekeying process includes generating a new encryption key. The initiating operation 806 in which the first IKE node initiates the rekeying process when the IPSec communication sessions is installed at the first IKE node, may further include obtaining, by the first IKE node from the client device, a response message indicating that the new encryption key has been generated by the client device.

According to one or more example embodiments, the method 800 may further include prior to obtaining the response message, providing, by the first IKE node to the client device, another control message using an old encryption key and replacing, by the first IKE node, the old encryption key with the new encryption key for the IPSec communication session based on obtaining the response message indicating that the new encryption key has been generated by the client device. The method 800 may further include providing, by the first IKE node to the client device, traffic of the IPSec communication session encrypted with the new encryption key.

According to one or more example embodiments, the obtaining operation 802 in which the first IKE node, from among a plurality of IKE nodes, obtains a subscription message published by a key value store, may include obtaining the response message based on an equal cost multi-path routing. The IPSec communication session may be one of an IKE session or an encapsulating security payload session.

According to one or more example embodiments, the method 800 may further include obtaining, by the first IKE node from the client device, a dead peer detection response for the IPSec communication session not installed locally at the first IKE node and obtaining, by the first IKE node from the key value store, the information about the IPSec communication session. The method 800 may further include installing, by the first IKE node, the IPSec communication session locally so as to exchange IKE control traffic with the client device and so as to remove the IPSec communication session from another IKE node that initiated a dead peer detection event, from among the plurality of IKE nodes.

According to one or more example embodiments, the method 800 may further include exchanging, by the first IKE node, the IKE control traffic with the client device. The exchanging by the first IKE node of the IKE control traffic may include at least one of: initiating the rekeying process in which an old encryption key is replaced with a new encryption key, debugging the IPSec communication session, or terminating the IPSec communication session.

According to one or more example embodiments, the method 800 may further include initiating, by the first IKE node, a dead peer detection generation for another IPSec communication session that only exists in the key value store. The initiating, by the first IKE node, the dead peer detection generation may include obtaining, by the first IKE node, information about the another IPSec communication session from the key value store, locally installing, by the first IKE node, the another IPSec communication session based on the information about the another IPSec communication session, and providing, by the first IKE node to the client device, a dead peer detection packet.

According to one or more example embodiments, the method 800 may further include obtaining, by the first IKE node from the client device, a response message indicating that the rekeying process completed at the client device. The rekeying process may include replacing an old encryption key for the IPSec communication session with a new encryption key and removing, by the first IKE node, from a local memory, the old encryption key. The IPSec communication session may be a virtual private network tunnel and based on a failure of the first IKE node, another IKE node from among the plurality of IKE nodes may replace the first IKE node during the rekeying process.

Example embodiments provide for rekey events for both IKE and ESP sessions to be handled by any IKE node in, for example, a cloud-native VPN installation, in which IKE nodes have been horizontally scaled. Accordingly, example embodiments provide for dynamic rekeying of IKE and ESP sessions in which the rekey processing is split across nodes in the middle of the rekey event itself, allowing for more dynamic rekey events and cloud-native IPSec in terms of the rekeying of session tunnels.

In still another example embodiment, an apparatus is provided that includes a memory, a network interface unit configured to enable network communications, and a processor. The processor is configured to initiate a rekeying process for an Internet Protocol Security (IPSec) communication session established with a client device and serviced by a first IKE node from among the plurality of IKE nodes, and in which a first encryption key is used to encrypt traffic, to obtain from a key value store, information about the IPSec communication session and to perform at least a part of the rekeying process in which the first encryption key is replaced with a second encryption key for the IPSec communication session.

According to one or more example embodiments, the apparatus may be an IKE server or another IKE node from among the plurality of the IKE nodes except for the first IKE node.

In yet another example embodiment, an apparatus is provided that also includes a memory, a network interface unit configured to enable network communications, and a processor. The processor is configured to obtain from a first IKE node from among a plurality of IKE nodes, a first message indicating that an IPSec communication session needs to be rekeyed. The IPSec communication session is established with a client device and is serviced by a second IKE node. The processor is further configured to provide, to the first IKE node, information about the IPSec communication session including a security association to enable the first IKE node to locally install the IPSec communication session so as to initiate a rekeying process and so as to remove the IPSec communication session from the second IKE node.

According to one or more example embodiments, the apparatus may be key value store or a key value store device that stores a plurality of encryption keys for a plurality of IPSec communication sessions handled by the plurality of IKE nodes.

In yet another example embodiment, an apparatus is provided that also includes a memory, a network interface unit configured to enable network communications, and a processor. The processor is configured to obtain a subscription message published by a key value store. The subscription message includes information about an IPSec communication session that needs to be rekeyed. The processor is further configured to determine whether the IPSec communication session is installed locally at the apparatus for communication with a client device and when the IPSec communication session is installed locally at the apparatus, the processor is further configured to initiate a rekeying process.

According to one or more example embodiments, the apparatus may be an IKE server or another IKE node from among the plurality of the IKE nodes except for the first IKE node.

Figure 9:
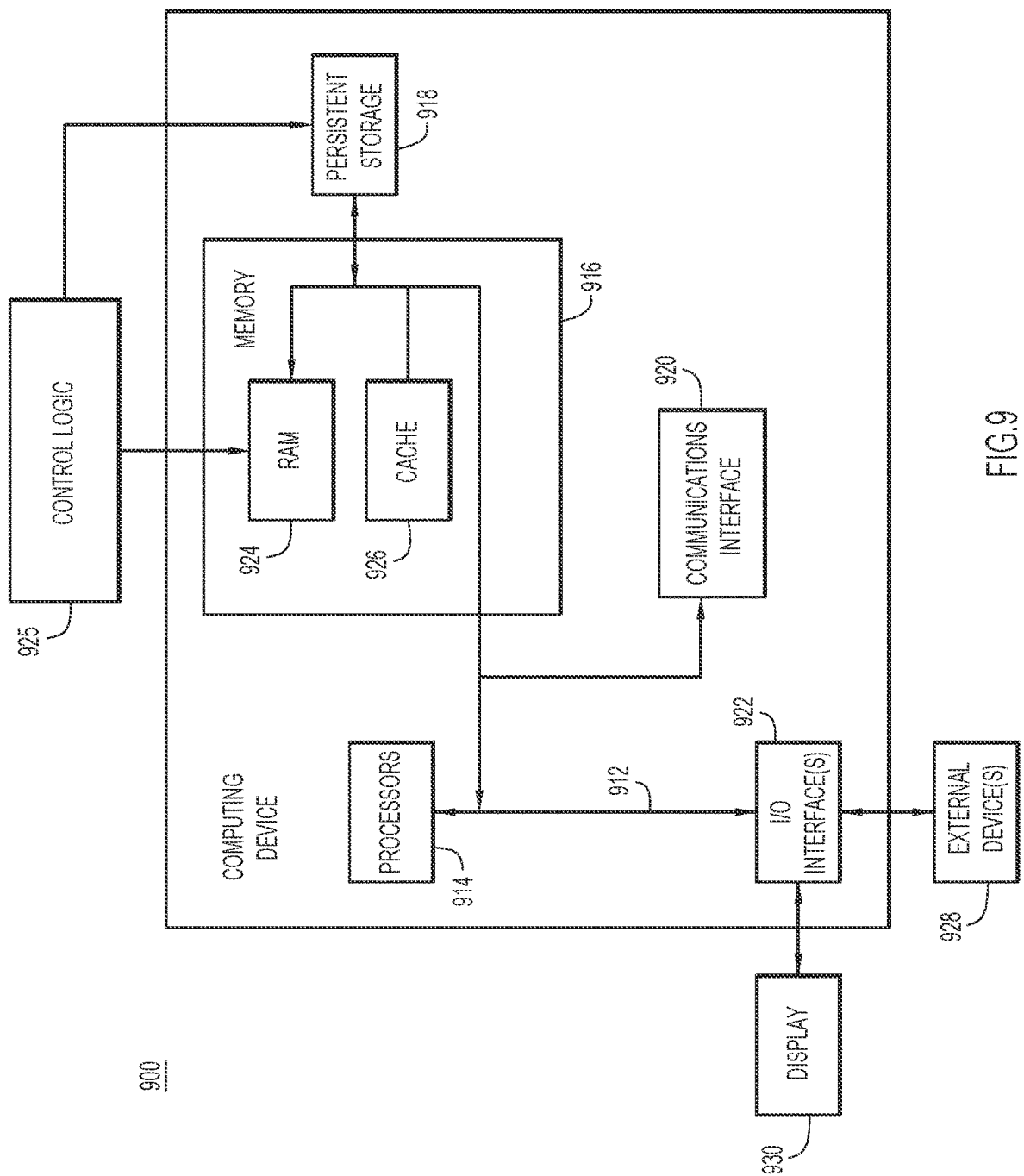
FIG. 9 is a hardware block diagram of a computing device configured to perform a decentralized IPSec key negotiation, according to various example embodiments.

FIG. 9 is a hardware block diagram of a computing device 900 configured to perform a decentralized IPSec key negotiation, according to various example embodiments. Specifically, illustrated in FIG. 9 is an apparatus that may be configured to implement any of the functions described above with regard to an ESP data node/server, an IKE server/IKE node, and/or a K/V store/key value store/key value store device, described above with reference to FIGS. 1-8. It should be appreciated that FIG. 9 provides only an illustration of various embodiments and does not imply any limitations with regard to the environments in which different embodiments may be implemented. Many modifications to the depicted environment may be made.

As depicted, the computing device 900 includes a bus 912, which provides communications between computer processor(s) 914, a memory 916, a persistent storage 918, communications interface 920, and input/output (I/O) interface(s) 922. The bus 912 can be implemented with any architecture designed for passing data and/or control information between processors (such as microprocessors, communications and network processors, etc.), system memory, peripheral devices, and any other hardware components within a system. For example, the bus 912 can be implemented with one or more buses.

The memory 916 and persistent storage 918 are computer readable storage media. In the depicted example embodiment, the memory 916 includes a random access memory (RAM) 924 and a cache (cache memory) 926. In general, the memory 916 can include any suitable volatile or non-volatile computer readable storage media that stores instructions for the control logic 925.

When the computing device 900 is an IKE server or an IKE node, the control logic 925 includes a decentralized key negotiation software that includes instructions for initiating a rekeying process for an IPSec communication session established with a client device and serviced by another IKE node from among the plurality of IKE nodes, and in which a first encryption key is used to encrypt traffic, for obtaining, from a key value store, information about the IPSec communication session and for performing at least a part of the rekeying process in which the first encryption key is replaced with a second encryption key for the IPSec communication session. According to another embodiment, the control logic 925 includes instructions for obtaining a subscription message published by a key value store, where the subscription message includes information about IPSec communication session that needs to be rekeyed, for determining whether the IPSec communication session is locally installed at the apparatus for communication with a client device, and for imitating the rekeying process when the IPSec communication session is determined to be locally installed.

When the computing device 900 is the K/V store or the key value store device, the control logic 925 includes a decentralized key negotiation software that includes instructions for obtaining, from a first IKE node from among a plurality of IKE nodes, a first message indicating that an IPSec communication session needs to be rekeyed, where the IPSec communication session is established with a client device and is serviced by a second IKE node and for providing, to the first IKE node, information about the IPSec communication session including a security association to enable the first IKE node to locally install the IPSec communication session so as to initiate a rekeying process and so as to remove the IPSec communication session from the second IKE node.

The control logic 925 may be software stored in the memory 916 or the persistent storage 918 for execution by the processor(s) 914.

One or more programs may be stored in persistent storage 918 for execution by one or more of the respective computer processors 914 via one or more memories of memory 916. The persistent storage 918 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by the persistent storage 918 may also be removable. For example, a removable hard drive may be used for persistent storage 918. Other examples include optical and magnetic disks, thumb drives, and smart cards that are inserted into a drive for transfer onto another computer readable storage medium that is also part of persistent storage 918.

The communications interface 920, in these examples, provides for communications with other data processing systems or devices. In these examples, communications interface 920 includes one or more network interface cards. Communications interface 920 may provide communications through the use of either or both physical (wired) and wireless communications links.

The I/O interface(s) 922 allows for input and output of data with other devices that may be connected to the computing device 900. For example, the I/O interface 922 may provide a connection to external devices 928 such as a keyboard, keypad, a touch screen, and/or some other suitable input device. External devices 928 can also include portable computer readable storage media such as database systems, thumb drives, portable optical or magnetic disks, and memory cards.

Software and data used to practice embodiments can be stored on such portable computer readable storage media and can be loaded onto persistent storage 918 via I/O interface(s) 922. I/O interface(s) 922 may also connect to a display 930. The display 930 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing system employed by the present embodiments may be implemented by any personal or other type of computer or processing system (e.g., desktop, laptop, personal data assistant (PDA), mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, wireless access network (WAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The present embodiments may employ any number of any type of user interface (e.g., Graphical User Interface (GUI), command-line, prompt, etc.) for obtaining or providing information (e.g., data relating to providing enhanced delivery options), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as C++, Python, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

According to yet another example embodiment, a method of decentralized key negotiation is provided, which is performed by a system. The system includes one or more computers executing instructions to enable a plurality of IKE nodes to service IPSec communication sessions of a plurality of client devices. The method includes servicing, by a first IKE node from among the plurality of IKE nodes, a first IPSec communication session from among the IPSec communication sessions. The first IPSec communication session is established with a first client device from among the plurality of client devices. The method further includes initiating, by a second IKE node from among the plurality of IKE nodes, a rekeying process for the first IPSec communication session in which a first encryption key used to encrypt data traffic of the IPSec communication session is replaced with a second encryption key. The rekeying process is performed by at least two IKE nodes from among the plurality of IKE nodes.

In yet another example embodiment, one or more non-transitory computer readable storage media encoded with instructions are provided. When the media is executed by a processor, they cause the processor to execute the above-described methods or operations.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
performing a dead peer detection process for an Internet Protocol Security (IPSec) communication session that has no traffic and is stored in a key value store, wherein the dead peer detection process includes:
obtaining, by a first Internet Key Exchange (IKE) node of a plurality of IKE nodes, information about the IPSec communication session from the key value store,
locally installing, by the first IKE node, the IPSec communication session based on the information about the IPSec communication session, and
providing, by the first IKE node to a client device, a dead peer detection request, wherein at least one other IKE node obtains from the client device a response to the dead peer detection request and continues the dead peer detection process so as to remove the IPSec communication session from the key value store.

2. The method of claim 1, further comprising:
initiating, by the first IKE node, the dead peer detection process; and
generating a dead peer detection packet that includes the dead peer detection request.

3. The method of claim 1, wherein the dead peer detection process is initiated by the first IKE node, and further comprising:
obtaining, by the at least one other IKE node from the client device, the response for the IPSec communication session not installed locally and continuing the dead peer detection process.

4. The method of claim 3, wherein the response is based on a dead peer detection packet that includes the dead peer detection request provided to the client device by the first IKE node.

5. The method of claim 3, wherein the IPSec communication session is locally installed at the at least one other IKE node so as to exchange an IKE control traffic with the client device and so as to remove the IPSec communication session from the at first IKE node that initiated the dead peer detection process.

6. The method of claim 5, further comprising:
exchanging, by the at least one other IKE node, the IKE control traffic with the client device, wherein the IKE control traffic relates to at least one of:
debugging the IPSec communication session, or
terminating the IPSec communication session.

7. The method of claim 1, wherein initiating the dead peer detection process is based on detecting that the IPSec communication session remains idle or non-operational for a predetermined period of time.

8. The method of claim 1, wherein the IPSec communication session is one of an IKE session or an encapsulating security payload session.

9. The method of claim 1, further comprising:
removing the IPSec communication session from the first IKE node based on an event published to the key value store by the at least one other IKE node that is continuing the dead peer detection process.

10. The method of claim 1, wherein the IPSec communication session is removed from the key value store based on the dead peer detection process.

11. An apparatus comprising:
a memory;
a network interface configured to enable network communications; and
a processor, wherein the processor is configured to perform operations comprising:
performing a dead peer detection process for an Internet Protocol Security (IPSec) communication session that has no traffic and is stored in a key value store, wherein the dead peer detection process includes:
obtaining information about the IPSec communication session from the key value store,
locally installing the IPSec communication session based on the information about the IPSec communication session, and
providing, to a client device, a dead peer detection request, wherein at least one Internet Key Exchange (IKE) node other than the apparatus from a plurality of IKE nodes obtains from the client device a response to the dead peer detection request and continues the dead peer detection process so as to remove the IPSec communication session from the key value store.

12. The apparatus of claim 11, wherein the processor is configured to perform additional operations comprising:
initiating the dead peer detection process; and
generating a dead peer detection packet including the dead peer detection request.

13. The apparatus of claim 11, wherein the dead peer detection process is initiated by the apparatus and the at least one IKE node obtains from the client device, the response for the IPSec communication session not installed locally and continues the dead peer detection process.

14. The apparatus of claim 13, wherein the response is based on a dead peer detection packet that includes the dead peer detection request provided to the client device by the apparatus.

15. The apparatus of claim 11, wherein the processor is further configured to perform:
removing the IPSec communication session from the apparatus based on an event published to the key value store by the at least one IKE node that is continuing the dead peer detection process.

16. The apparatus of claim 11, wherein the IPSec communication session is removed from the key value store by performing the dead peer detection process by the processor and the at least one IKE node.

17. One or more non-transitory computer readable storage media encoded with instructions that, when executed by a processor, cause the processor to execute a method comprising:

performing a dead peer detection process for an Internet Protocol Security (IPSec) communication session that has no traffic and is stored in a key value store, wherein the dead peer detection process includes:

obtaining information about the IPSec communication session from the key value store, locally installing the IPSec communication session based on the information about the IPSec communication session, and providing, to a client device, a dead peer detection request, wherein at least one Internet Key Exchange (IKE) node from a plurality of IKE nodes other than a node that includes the processor obtains a response to the dead peer detection request and continues the dead peer detection process so as to remove the IPSec communication session from the key value store.

18. The one or more non-transitory computer readable storage media of claim 17, wherein the method further comprises:

initiating the dead peer detection process; and generating a dead peer detection packet that includes the dead peer detection request.

19. The one or more non-transitory computer readable storage media of claim 17, wherein the method further comprises:

removing the IPSec communication session that is locally installed based on an event published to the key value store by the at least one IKE node that is continuing the dead peer detection process.

20. The one or more non-transitory computer readable storage media of claim 17, wherein the IPSec communication session is removed from the key value store by performing the dead peer detection process by the processor and the at least one IKE node.

\* \* \* \* \*